United States Patent [19]
Greskovich et al.

[11] 4,379,110
[45] Apr. 5, 1983

[54] SINTERING OF SILICON NITRIDE TO HIGH DENSITY

[75] Inventors: Charles D. Greskovich, Schenectady; John A. Palm, Jonesville; Svante Prochazka, Ballston Lake, all of N.Y.

[73] Assignee: General Electric Company, Schenectady, N.Y.

[21] Appl. No.: 301,707

[22] Filed: Sep. 14, 1981

Related U.S. Application Data

[63] Continuation of Ser. No. 65,121, Aug. 9, 1979, abandoned.

[51] Int. Cl.$^3$ .................................................. C04B 35/58
[52] U.S. Cl. ........................................ 264/65; 264/66; 264/325; 501/154
[58] Field of Search ....................... 264/65, 66, 325; 501/154

[56] References Cited

U.S. PATENT DOCUMENTS 4,119,689 10/1978 Prochazka .............................. 264/65

FOREIGN PATENT DOCUMENTS 1300864 12/1972 United Kingdom .............. 264/325

OTHER PUBLICATIONS

Hardtl, "Gas Isostatic Hot Pressing without Molds", *Ceramic Bulletin*, vol. 54, No. 2, (1975), pp. 201–205, 207.

*Primary Examiner*—John A. Parrish
*Attorney, Agent, or Firm*—Jane Binkowski; James C. Davis, Jr.; James Magee, Jr.

[57] ABSTRACT

A silicon nitride compact with a density of 95% to 100% is produced by forming a particulate dispersion of silicon nitride and beryllium additive into a compact, firstly sintering the compact from about 1900° C. to about 2200° C. in nitrogen at superatmospheric pressure sufficient to prevent thermal decomposition of the silicon nitride until the entire outside surface of the compact becomes impermeable to nitrogen gas, and then secondly sintering the compact from about 1800° C. to about 2200° C. under a nitrogen pressure having a value at least twice the first nitrogen sintering pressure.

5 Claims, 1 Drawing Figure

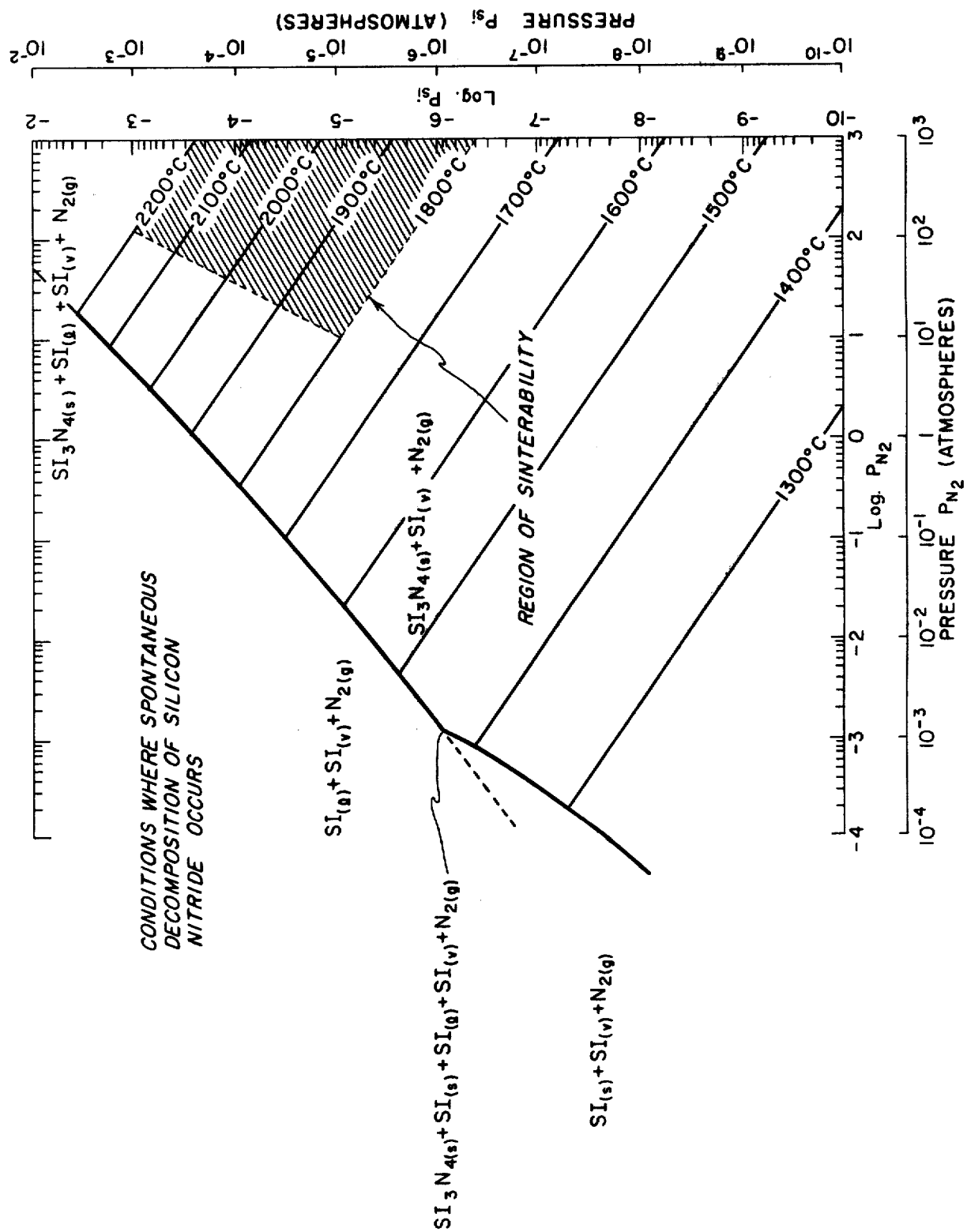

SINTERING OF SILICON NITRIDE TO HIGH DENSITY

The invention herein described was made in the course of or under a contract or subcontract thereunder (or grant) with the Department of the Army.

This application is a continuation of application Ser. No. 065,121, filed Aug. 9, 1979 now abandoned.

The present invention relates to a method of producing a pre-shaped polycrystalline silicon nitride sintered body of high density.

Silicon nitride, the stoichiometric formulation for which is $Si_3N_4$, is a refractory electrical insulator with high strength, hardness, high resistance to thermal shock and consequently, has many potential high temperature applications. The characteristics which make it unique among other materials is the low thermal expansion coefficient combined with its refractoriness and oxidation stability. Silicon nitride has long been a prime candidate material in the development of components for high temperature heat engines.

Silicon nitride parts are currently manufactured by either reaction bonding of silicon or hot-pressing. The first process has inherent limitations in achievable densities, and therefore strength, which exclude it from a number of typical applications. Consolidation by hot-pressing is achieved by using additions of oxides or nitrides of Mg, Be, Ca, Y, La, Ce, Zr to $Si_3N_4$ powders. The resulting ceramic is very strong but machining of complex components is very lengthy, difficult and frequently impossible or prohibitively expensive.

Sintering which would overcome the shaping problems has also been tried but with limited results since at temperatures approaching 1750° C. at atmospheric pressure silicon nitride decomposes rapidly. Silicon nitride with 90% density has been obtained by using an addition of 5% magnesia, by G. R. Terwilliger and F. F. Lange, "Pressureless Sintering of $Si_3N_4$", Journal of Materials Science 10(1975)1169, however weight losses of up to 30% were observed and made the process impractical.

M. Mitomo, "Pressure Sintering of $Si_3N_4$", Journal of Materials Science 11(1976)1103–1107, discloses the sintering of $Si_3N_4$ with 5% MgO at 1450° to 1900° C. under a pressure of 10 atmospheres of nitrogen producing a maximum density of 95% of the theoretical value, that density and weight loss initially increased at the higher temperatures, that the density then decreased above a certain temperature because it was determined by two countervailing processes, shrinkage and thermal decomposition of silicon nitride and that his optimum temperature was ~1800° C.

It is known in the art that the high magnesium oxide additive necessary to induce sintering degrades oxidation resistance and high temperature mechanical properties of the silicon nitride product. The present invention does not use a magnesium oxide additive.

U.S. Pat. No. 4,119,689 to Prochazka et al., assigned to the assignee hereof and incorporated herein by reference, discloses the production of a sintered silicon nitride body by shaping a dispersion of silicon nitride and a beryllium additive into a green body and sintering it at about 1900° C. to about 2200° C. in nitrogen at a superatmospheric pressure which at the sintering temperatures prevents significant thermal decomposition of said silicon nitride and produces a sintered body with a density ranging from about 80% to about 100% of the theoretical density of silicon nitride. U.S. Pat. No. 4,119,689 discloses that the minimum pressure of the nitrogen ranges from about 20 atmospheres at a sintering temperature of 1900° C. to a minimum pressure of about 130 atmospheres at a sintering temperature of 2200° C. and that pressures of nitrogen higher than the required minimum pressure at a particular sintering temperature are useful to additionally densify the body to produce a sintered body having a density higher than 80%. The patent further discloses that the preferred maximum pressure of nitrogen is one which produces a sintered body of the highest density at the particular sintering temperature and such preferred maximum nitrogen pressure is determinable empirically.

The present invention allows the production of silicon nitride bodies of very high density ranging from about 95% to 100% density, consistently and reproducibly, at relatively low superpressures of nitrogen by sintering a green body or compact having an oxygen content of at least about 1.4% by weight of the starting silicon nitride powder and by using a two step sintering process. Specifically, in the first or initial sintering step, the compact is sintered, preferably at a minimum pressure of nitrogen, until its entire external surface becomes impermeable to nitrogen gas, and subsequently, in the second or final sintering step, the compact is sintered to a density ranging from about 95% to about 100% under a nitrogen pressure having a value at least about twice the value of the initial nitrogen sintering pressure. Also, in the present process, the sintering body undergoes no significant weight loss due to the thermal decomposition of the silicon nitride and this is indicated by the high densities of the resulting sintered product which ranges from about 95% to 100% of the theoretical density of silicon nitride. In addition, the present invention makes it possible to fabricate complex shaped articles of silicon nitride directly with little or no machining.

Those skilled in the art will gain a further and better understanding of the present invention from the detailed description set forth below, considered in conjunction with the FIGURE accompanying and forming a part of the specification which shows conditions where spontaneous decomposition of silicon nitride occurs, i.e. to the left of the heavy solid line, conditions where spontaneous decomposition of silicon nitride does not occur, i.e. to the right of the heavy solid line, and conditions necessary for producing the present sintered product, i.e. the shaded area referred to as the Region of Sinterability. Specifically, silicon nitride decomposes into silicon and nitrogen, and consequently, there is always a finite pressure of silicon vapor and nitrogen above a surface of silicon nitride. According to principles of chemical equilibrium, the higher the nitrogen pressure the lower the silicon vapor pressure and vice versa. The conditions shown to the right of the heavy solid line in the FIGURE are plots at a given temperature of the logarithm of the partial pressure of nitrogen and the logarithm of the corresponding partial pressure of silicon vapor. For convenience, a scale in atmospheres for the partial pressure of nitrogen as well as for the partial pressure of silicon vapor are given. At any conditions selected to the right of the heavy solid line in the FIGURE, spontaneous thermal decomposition of silicon nitride does not occur, but only the shaded area referred to as the Region of Sinterability sets forth temperature and corresponding pressure conditions which produce the present sintered product.

Briefly stated, the present method of producing a high density pre-shaped sintered polycrystalline silicon nitride body comprises providing at least a significantly homogeneous dispersion having an average particle size which is submicron of silicon nitride and a beryllium additive, said beryllium additive being used in an amount wherein the beryllium component is equivalent to from about 0.1% by weight to about 2% by weight of elemental beryllium based on the amount of silicon nitride, shaping said dispersion into a green body or compact, said compact containing oxygen in an amount ranging from about 1.4% by weight to about 7% by weight of said silicon nitride, and initially sintering said green body at a temperature ranging from about 1900° C. to about 2200° C. in a sintering atmosphere of nitrogen until the surface of the compact becomes impermeable to nitrogen gas, said nitrogen pressure ranging from about 10 atmospheres to about 130 atmospheres with the minimum pressure of said nitrogen during said initial sintering ranging from about 10 atmospheres at a sintering temperature of about 1900° C. to a minimum pressure of about 65 atmospheres at a sintering temperature of about 2200° C., and then secondly sintering said compact by raising the pressure of said nitrogen to a value of at least twice the value of said initial sintering pressure and sintering said compact at a temperature ranging from about 1800° C. to about 2200° C. to a density ranging from about 95% to 100%, said nitrogen being at a superatmospheric pressure which at said sintering temperatures prevents significant thermal decomposition of said silicon nitride.

By a significant thermal decomposition of silicon nitride herein it is meant significant weight loss of silicon nitride due to thermal decomposition of silicon nitride and such significant weight loss of silicon nitride would be higher than about 3% by weight of the total amount of silicon nitride in the green body. Usually, however, in the present invention, weight loss of silicon nitride due to thermal decomposition of silicon nitride is less than 2% by weight of the total amount of silicon nitride in the green body.

The silicon nitride powder used in the present process can be amorphous or crystalline or mixtures thereof. The crystalline silicon nitride powder can be $\alpha$- or $\beta$-silicon nitride or mixtures thereof.

The present starting silicon nitride powder can range in purity from a totally pure silicon nitride powder to one of ceramic grade. The necessary purity of the silicon nitride powder used depends largely on the temperatures and loads at which the final sintered product will be used at with the highest temperatures of use generally requiring the most pure powders. Specifically, with increasingly pure powder the resulting sintered product increasingly retains its room temperature properties at high temperatures, i.e. the more stable are the properties of the sintered product with increasing temperatures.

The present silicon nitride powder may contain metallic and non-metallic impurities. Specifically, based on the total composition of the starting silicon nitride powder, its oxygen content may range up to about 7% by weight. A powder having an oxygen content in excess of about 7% by weight provides no advantage because it is likely to produce a sintered product with impaired high temperature mechanical properties. Normally the oxygen is present in the form of silica. The amount of excess elemental silicon which may be present in the powder is not critical, providing it is of submicron size, since during the sintering process elemental silicon is nitrided to form silicon nitride, and providing that the volume increase accompanying nitridation of the elemental silicon has no significant deleterious effect on the sintered product. Ordinarily, elemental silicon may be present in silicon nitride powder in amounts ranging up to about 4% by weight. Non-metallic impurities such as halogens which evaporate during sintering and which do not significantly deteriorate the properties of the sintered silicon nitride body may also be present frequently in amounts up to about 3% by weight of the starting silicon nitride powder.

Ceramic grade silicon nitride powder normally contains metallic impurities such as calcium, iron, and aluminum which tend to form in the sintered product intergranular low melting phases that have a significantly deleterious effect on the product's properties at elevated temperatures. In the present process, when ceramic grade silicon nitride powder is used, the total amount of such metallic impurities should not be higher than that typically found in such powders which is about 1% by weight of the starting powder. With decreasing amounts of these metallic impurities, the mechanical properties of the resulting sintered product at elevated temperatures improve, particularly with elimination of calcium and iron.

In the present process the beryllium additive is selected from the group consisting of elemental beryllium, beryllium oxide, beryllium carbide, beryllium nitride, beryllium fluoride, beryllium silicon nitride and mixtures thereof. The known stoichiometric formulations for these additives are Be, BeO, Be$_2$C, Be$_3$N$_2$, BeF$_2$, and BeSiN$_2$, Be$_6$Si$_3$N$_8$, Be$_4$SiN$_4$, Be$_5$Si$_2$N$_6$, Be$_{11}$Si$_5$N$_{14}$, Be$_9$Si$_3$N$_{10}$. In the present process the beryllium additive is used in an amount so that its beryllium component is equivalent to from about 0.1% to about 2.0% by weight of elemental beryllium, and preferably from about 0.5% to about 1.0% by weight of elemental beryllium, based on the amount of silicon nitride.

In carrying out the process at least a significantly or substantially uniform or homogeneous particulate dispersion or mixture having an average particle size which is submicron of silicon nitride and beryllium additive is formed. Such a dispersion is necessary to produce a sintered product with significantly uniform properties and having the desired density. The silicon nitride and beryllium additive powders, themselves, may be of a particle size which breaks down to the desired size in forming the dispersion, but preferably the starting silicon nitride is submicron and the starting beryllium additive is less than 5 microns in particle size, and preferably submicron. Generally, the silicon nitride powder ranges in mean surface area from about 2 square meters per gram to about 50 square meters per gram which is equivalent to about 0.94 micron to 0.04 micron, respectively. Preferably, the silicon nitride powder ranges in mean surface area from about 5 square meters per gram to about 25 square meters per gram which is equivalent to about 0.38 micron to about 0.08 micron, respectively.

The silicon nitride and beryllium additive powders can be admixed by a number of techniques such as, for example, ball milling or jet milling, to produce a significant or substantially uniform or homogeneous dispersion or mixture. The more uniform the dispersion, the more uniform is the microstructure, and therefore, the properties of the resulting sintered body.

Representative of these mixing techniques is ball milling, preferably with balls of a material such as tungsten carbide or silicon nitride which has low wear and which has no significant detrimental effect on the properties desired in the final product. If desired, such milling can also be used to reduce particle size, and to distribute any impurities which may be present substantially uniformly throughout the powder. Preferably, milling is carried out in a liquid mixing medium which is inert to the ingredients. Typical liquid mixing mediums include hydrocarbons such as benzene and heptane. Milling time varies widely and depends largely on the amount and particle size of the powder and type of milling equipment. In general, milling time ranges from about 1 hour to about 100 hours. The resulting wet milled material can be dried by a number of conventional techniques to remove the liquid medium. Preferably, it is dried in a vacuum oven maintained below the boiling point of the liquid mixing medium.

A number of techniques can be used to shape the powder mixture, i.e., particulate dispersion, into a green body, or compact. For example, the powder mixture can be extruded, injection molded, die-pressed, isostatically pressed or slip cast to produce the green body of desired shape. Any lubricants, binders or similar materials used in shaping the dispersion should have no significant deteriorating effect on the green body or the resulting sintered body. Such materials are preferably of the type which evaporate on heating at relatively low temperatures, preferably below 500° C., leaving no significant residue. The green body should have a density of at least about 35%, and preferably at least about 45% or higher, to promote sufficient densification during sintering and achieve attainment of the desired density.

In the present invention, the compact being sintered should contain oxygen in an amount ranging from at least about 1.4% by weight up to about 7% by weight of the silicon nitride. Such oxygen content initially may be present in the silicon nitride powder, or it may be introduced into the powder, or into the homogeneous particulate dispersion of silicon nitride and beryllium additive, or into the compact formed from such dispersion. To elevate the oxygen content to the desired amount, it is preferable to oxidize the homogeneous dispersion or compact. However, before the green compact can be oxidized, it must be fired, normally up to about 500° C. in air for about 1 hour, to remove any lubricants, binders or similar materials used in its shaping. Oxidation of the fired body or homogeneous dispersion powder to a prescribed amount can be carried out, for example, by heating the weighed compact or powder in a temperature ranging from about 900° to about 1050° C. in an atmosphere of oxygen or air and monitoring increase in oxygen content by weight gain measurements. Alternatively, oxygen content of the treated compact or powder can be determined by neutron activation analysis.

The oxygen content in the compact being sintered ranges from about 1.4% by weight to about 7% by weight of the silicon nitride component. It is believed that the oxygen and beryllium form a liquid phase during sintering which promotes densification of the body. Therefore, the preferred amount of oxygen depends largely on the equivalent amount of beryllium present with which it can form a liquid phase, and it has been found that such preferred amount is at least about 2% by weight oxygen for an equivalent amount of beryllium less than 1% by weight, about 3.5% by weight oxygen for an equivalent amount of beryllium of about 1% by weight, and about 7% by weight oxygen for an equivalent amount of beryllium of about 2% by weight.

An amount of oxygen in excess of about 7% by weight provides no significant advantage.

Should the oxygen content be too high, the powder or compact can be calcined to reduce its oxygen content at a temperature ranging from about 1400° C. to about 1500° C. in a vacuum or in an atmosphere which has no significant deteriorating effect on the powder such as helium, nitrogen, hydrogen and mixtures thereof.

In the present process, the sintering atmosphere of nitrogen can be stagnant or a flowing atmosphere and need only be sufficiently flowing to remove gaseous products which may be present, normally as a result of contaminants. Generally, the specific flow rate of nitrogen gas depends on factors such as the size of the furnace loading and sintering temperature.

In the present process, the initial first sintering of the compact is carried out at a temperature ranging from about 1900° C. to about 2200° C. and the subsequent second sintering is carried out at about 1800° C. to about 2200° C. All sintering is carried out in an atmosphere of nitrogen at superatmospheric pressure which at the sintering temperature prevents thermal decomposition of the silicon nitride and also promotes shrinkage, i.e. densification, of the compact. Sintering temperatures lower than about 1800° C. are not effective for producing the present sintered product whereas temperatures higher than 2200° C. would require nitrogen pressures too high to be practical. Preferably, for the first and second sintering steps the temperature ranges from about 1900° C. to 2100° C.

The effect of nitrogen pressure on the sintering of silicon nitride can be best described by considering the effect of nitrogen pressure on the thermal decomposition.

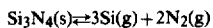

i.e. solid silicon nitride decomposes into silicon and nitrogen gases, and consequently there is always a finite pressure of silicon vapor and nitrogen above a surface of silicon nitride. According to principles of chemical equilibrium, the higher the nitrogen pressure the lower the silicon vapor pressure and vice versa. This may be expressed in quantitative terms by $$P_{Si}^3 \times P_{N_2}^2 = K_{(T)}$$

where $P_{Si}$ is partial pressure of silicon vapor, $P_{N_2}$ partial pressure of nitrogen gas and K is the equilibrium constant which is calculated from available published thermodynamical data and refers to a specific temperature. Specifically, the published thermodynamical data relied on herein is disclosed in Still et al, JANAF Thermochemical Tables, 2nd Ed., U.S. Dept. of Commerce, Nat. Stand. Ref. Data Ser.—Nat. Bur. Stand. (United States), 37 U.S. Government Printing Office, Washington, (June 1971). These thermodynamic relationships were calculated and are shown in the accompanying figure where the logarithm of partial pressure of silicon vapor and partial pressure of nitrogen were plotted along with temperature scales and the coexisting phases shown.

From the FIGURE it can be seen that if nitrogen pressure above $Si_3N_4$ decreases at a given temperature, silicon vapor pressure increases until the saturated pressure of silicon vapor at the temperature applied is reached. At this and at lower nitrogen pressures silicon nitride will spontaneously decompose into silicon metal (liquid or solid) and nitrogen. In the FIGURE, the heavy solid line, from lower left to upper right delineates the set of conditions where silicon nitride, condensed silicon, silicon vapor and nitrogen gas coexist, i.e. conditions where spontaneous decomposition of silicon nitride occurs. Specifically, at any conditions selected to the left of the heavy solid line determined by nitrogen pressure and temperature, spontaneous decomposition of $Si_3N_4$ excludes sintering. At any conditions selected to the right of the heavy solid line, spontaneous thermal decomposition of silicon nitride does not occur. However, according to the present invention, only the shaded area in the figure referred to as the Region of Sinterability sets forth temperature and corresponding pressure conditions which prevent thermal decomposition or significant thermal decomposition of the silicon nitride and also produce the present sintered product. specifically, the figure illustrates that at every sintering temperature in the Region of Sinterability, a particular minimum pressure of nitrogen has to be applied and maintained which is substantially higher than the minimum pressure of nitrogen necessary to prevent spontaneous silicon nitride decomposition. The minimum sintering pressure of nitrogen is one which at a particular sintering temperature prevents thermal decomposition or significant thermal decomposition of the silicon nitride and also promotes densification, i.e. shrinkage, of the body.

Generally, at a given sintering temperature in the Region of Sinterability, an increase in nitrogen pressure will shown an increase in the density of the sintered product, i.e., higher nitrogen pressures should produce higher density products. Likewise, at a given nitrogen pressure in the Region of Sinterability, the higher the sintering temperature, the higher should be the density of the resulting sintered product.

The shaded area referred to as the Region of Sinterability in the accompanying figure shows that the particular minimum pressure of nitrogen used in the present process depends on sintering temperature and ranges from about 10 atmospheres at 1800° C. to about 130 atmospheres at a temperature of 2200° C. Specifically, the figure shows that in accordance with the present process the minimum required pressure of nitrogen at 1900° C. is about 20 atmospheres, at 2000° C. it is about 40 atmospheres, and at 2100° C. it is about 75 atmospheres. However, in the present process, when the compact or green body is placed within a gas-permeable enclosure, such as, for example, a crucible covered with a screwed-down lid, the minimum required nitrogen pressure of the present invention decreases by about 50%. Therefore, in such instance, a minimum nitrogen pressure of about 10 atmospheres is required at 1900° C., a minimum nitrogen pressure of at least about 20 atmospheres is required at 2000° C., a minimum nitrogen pressure of about 37 atmospheres is required at 2100° C. and a minimum nitrogen pressure of about 65 atmospheres is required at 2200° C. Representative of materials useful for forming the present gas permeable enclosures are boron nitride, silicon nitride, aluminum nitride and silicon carbide. In the present process pressures of nitrogen higher than the required minimum pressure at a particular sintering temperature are useful to additionally densify the body.

The first sintering of the green body or compact is carried out at a temperature ranging from about 1900° C. to about 2200° C. under a superatmospheric pressure of nitrogen ranging from about 10 atmospheres to about 130 atmospheres and at which at the sintering temperature prevents significant thermal decomposition of the silicon nitride. The particular pressure used during this first sintering step depends upon the speed desired of the densification process, and the higher the pressure, the faster is the densification procedure. As a practical matter, the minimum required pressures of nitrogen are preferable and range from about 10 atmospheres at a sintering temperature of about 1900° C. to a minimum pressure of about 65 atmospheres at a sintering temperature of about 2200° C.

The first sintering of the green body or compact is carried out until at least the pores in the entire outside surface of the compact are closed making such sintered surface impermeable to nitrogen gas. The stage at which the sintered surface of the compact becomes impermeable to nitrogen gas depends largely on its particular composition and sintering conditions and can be determined empirically. For example, it can be determined by suspending the compact and immersing it in water or other liquid and determining whether the thus-suspended-immersed compact shows any observable weight gain. If no weight gain is observed, then the compact will have attained closed porosity in its entire outer surface. Alternatively, initial sintering can be carried out until the pores of the compact become closed and this can be determined, for example, by careful metallographic examination of polished sections of the sintered compact. Generally, all or substantially all of the pores of the compact are closed when it has a density ranging from about 90% to about 93%.

Upon completion of the first sintering step, the $N_2$ pressure is raised to a value of at least about twice the value of the nitrogen sintering pressure used during initial sintering, and sintering of the compact is then continued at a temperature ranging from about 1800° C. to about 2200° C. in such higher nitrogen pressure until it has a density ranging from about 95% to about 100%. In this second sintering step, pressures higher than twice the value of the initial sintering nitrogen pressure can be used to speed up the densification process, and, usefully, may range up to about four times the initial sintering nitrogen pressure. However, nitrogen pressures higher than about four times the value of the initial sintering nitrogen pressure provide no significant advantage, and if desired, the entire present process can be carried out under a pressure lower than 100 atmospheres.

A compact having a surface impermeable to nitrogen gas is required for the present second sintering step to prevent diffusion of the higher nitrogen pressure thereinto since it is believed that such diffusion into the compact may hinder its densification due to the resistance produced by such high pressure gas within the pores of the compact. Specifically, during the first sintering step, a pressure of nitrogen is used which is at least about 50% lower than the nitrogen pressure used in the second sintering step, and such lower first sintering pressure becomes trapped within the closed pores of the compact. During the second sintering step, the much higher nitrogen sintering pressure cannot diffuse through the closed-pore surface of the compact, and consequently, can only act to promote its densification.

The sintered product of the present invention is composed primarily, i.e. more than 99% by volume, of $\beta$-silicon nitride containing oxygen and beryllium in solid solution, with less than 1% by volume of the product being an amorphous glassy phase. The microstructure of the sintered product is characterized by elongated grains of β-silicon nitride ranging in size from about 1 micron to about 15 microns with an average grain size being typically about 3 microns to 5 microns. The residual pore size is distributed between the silicon nitride grains and the amorphous or liquid phase is present primarily in pockets between the silicon nitride grains.

The present sintered product has a density ranging from about 95% to 100% of the theoretical density of silicon nitride and is one wherein most of or all of the residual pores are closed, i.e. non-interconnecting, and such a sintered body is preferred since it is impervious and highly resistant to internal oxidation at elevated temperatures. Also, the higher the density of the sintered product, the better are its mechanical properties.

The present invention makes it possible to fabricate complex shaped polycrystalline silicon nitride ceramic articles directly. Specifically, the present sintered product can be produced in the form of a useful complex shaped article without machining such as an impervious crucible, a thin walled tube, a long rod, a spherical body, or a hollow shaped article. The dimensions of the present sintered product differ from those of its green body by the extent of shrinkage, i.e. densification, which occurs during sintering. Also, the surface quality of the sintered body depends on that of the green body from which it is formed, i.e. it has a substantially smooth surface if the green body from which it is formed has a smooth surface.

The high density product of the present invention is particularly useful as dies and containers for liquid silicon for the growth of silicon ribbons and sheets for solar cell applications. It is also particularly useful for high temperature load bearing applications such as turbine blades.

In the present invention, unless otherwise stated, the density of the sintered body as well as that of the green body or compact is given as a fractional density of the theoretical density of silicon nitride (3.18/cc).

The invention is further illustrated by the following example wherein the procedure was as follows unless otherwise stated:

Surface area measurements were made by a low temperature nitrogen absorption technique.

Sintering was carried out in an electrically heated graphite pressure furnace.

Heating rates to sintering temperature ranged from about 5° C. to about 20° C per minute.

At the end of each sintering run, the power was switched off and the sintered silicon nitride bodies were furnace cooled to room temperature in the nitrogen atmosphere which was slowly depressurized to atmospheric pressure.

The bulk density of each green body was determined from its weight and dimensions.

Density of the sintered product was determined by water displacement using Archimedes method.

Shrinkage given in Table I is linear shrinkage $\Delta L/L_o$ (%), and it is the difference in length between the green body and the sintered body, $\Delta L$, divided by the length of the green body $L_o$. This shrinkage is an indication of the extent of densification.

Commercial grade high purity bottled nitrogen gas was used.

Oxygen content is based on the total weight of silicon nitride and was determined by weight measurements and neutron activation analysis.

% Weight loss is the difference in weight between the green and sintered bodies divided by the weight of the green body.

EXAMPLE 1

For Runs 1 to 8 tabulated in Table I, a silicon nitride powder was used which was 99.99% pure with respect to cation impurities, and for Run 9 the silicon nitride powder was 99.6% pure with respect to cation impurities. Also, in all of the runs of Table I the only additive used was $BeSiN_2$ powder which was admixed with the silicon nitride powder in Runs 1 to 8 in an amount of 7% by weight of silicon nitride powder which corresponds to 1.0% by weight of elemental beryllium, and in Run 9 in an amount of 3.5% by weight which corresponds to 0.5% by weight of elemental beryllium.

For each run the silicon nitride and $BeSiN_2$ powders were admixed to produce a homogeneous particulate dispersion or mixture by ball milling the powder mixture in a steel mill with steel balls and benzene for 72 hours. After benzene removal by evaporation, the milled powder was acid leached in a 20% solution of HCl to remove metallic contaminants acquired during prolonged milling. The suspension was repeatedly washed with water until $Fe^{2+}$ free. Final sedimentation of the powder mixture was achieved by acetone washing. The powder mixture was dried in a vacuum oven at 100° C.

In each run the resulting powder mixture, i.e. dispersion, was at least 99.6% pure with respect to cation impurities and had an average particle sized which was submicron.

The powder mixture in Runs 1, 2 and 3 had a specific surface area of 13.3 $m^2/g$ and an oxygen content of 3.2 wt. %.

The powder mixture of Runs 4 to 8 had a specific surface area of 11.1 $m^2/g$ and an oxygen content of 1.81 weight %. Before use in Runs 4 to 8, this powder mixture was heated and oxidized at 1000° C. in air for 15 minutes which increased its oxygen content to 3.02 weight %.

The powder mixture in Run 9 had a specific surface area of 14 $m^2/g$ and an oxygen content of 1.47 weight %.

In each run, the powder mixture was die pressed at 5,000 psi followed by isostatic pressing at 30,000 psi into a compact with a green density of about 49%. In all of the tabulated runs the green compacts were of substantially the same size.

In Runs 4 to 9 the green compacts were oxidized at 1000° C. in oxygen for 10 minutes and their resulting oxygen content is given in Table I.

In carrying out Run 1, the compact was placed in a boron nitride crucible which was then covered with a screwed-down lid of boron nitride forming a gas permeable enclosure. The crucible was then placed in the furnace which was evacuated to remove air and moisture therefrom, including the atmosphere within the boron nitride crucible, by pulling a vacuum on the furnace. The furnace was then maintained under the vacuum as it was heated to about 1000° C. Nitrogen pressure was then introduced into the furnace to 23.5 atmospheres, and then heating was continued to 2000° C. 23.5 atmospheres of $N_2$ was maintained during heating to 2000° C. by means of a pressure release valve. The compact was then sintered under 23.5 atmospheres $N_2$ at 2000° C. for 15 minutes.

Runs 2 to 9 were carried out in the same manner as disclosed for Run 1 except as indicated in Table I.

Runs 3 to 9 of Table I illustrate the present invention. Specifically, in each of Runs 3 to 9, after completion of the first sintering step, to carry out the second sintering step the pressure was raised to the given value within about 10 minutes and within this time period the given sintering temperature for the second sintering step was attained.

TABLE I

| Run No. | Wt % Oxygen Content of Unsintered Compact | Sintering Treatment | | Sintered Compact | | |
|---|---|---|---|---|---|---|
| | | First Sintering Step | 2nd Sintering Step | Rel. Density % | Linear Shrinkage % | Weight Loss (%) |
| 1 | 3.2 | 15 min-2000° C.-23.5atm $N_2$ | None | 92.5 | | |
| 2 | " | 15 min-2000° C.-70atm $N_2$ | None | 90 | | |
| 3 | " | 15 min-2000° C.-20atm $N_2$ | 18 min-2085° C.-70atm $N_2$ | 97.5 | 20 | 1.4 |
| 4 | ~3.7 | " | " | 99.6 | 22.5 | 1.0 |
| 5 | " | 15 min-2000° C.-20atm $N_2$ | 12 min-2000° C.-70atm $N_2$ | 99.4 | 22.8 | 1.8 |
| 6 | ~3.5 | 15 min-2000° C.-21atm $N_2$ | 20 min-1900° C.-70atm $N_2$ | 99.7 | 22.8 | 1.6 |
| 7 | " | 15 min-2000° C.-21atm $N_2$ | 30 min-1800° C.-70atm $N_2$ | 98.6 | 22.4 | 1.3 |
| 8 | ~3.3 | 15 min-2050° C.-30atm $N_2$ | 10 min-2000° C.-60atm $N_2$ | 97 | | <2 |
| 9 | ~2.6 | 15 min-1990° C.-23atm $N_2$ | 12 min-2000° C.-70atm $N_2$ | 96.8 | 17.6 | 2.7 |

In Table I, comparison of Runs 1 and 2 shows that increasing the $N_2$ pressure to 70 atmospheres did not produce a significant change in density in the sintered compact of this particular composition.

Runs 3 to 9 illustrate the present invention and show the production of sintered compacts of high densities by the present process. As shown by Runs 3 to 9 of Table I, the present process can be carried out under a pressure lower than 100 atmospheres.

It was known from previous runs which were carried out in substantially the same manner that at the end of the first sintering step of each of Runs 3 to 9, the compacts were impermeable to nitrogen gas by the water immersion technique, i.e. by suspension of the sintered compact in water and determining that the thus suspended-immersed compact showed no observable weight gain.

Mechanical test bars were machined from the sintered billet of Run 7 to evaluate mechanical and oxidative properties. This material exhibited a room temperature modulus of rupture of 550 MNm$^{-2}$ (80,000 psi) and a low oxidation rate of $\sim 10^{-12}$ kg$^2$m$^{-4}$s$^{-1}$ in air at 1400° C.

In copending U.S. application, Ser. No. 065,120 filed Aug. 9, 1979, now abandoned in favor of Ser. No. 296,676, filed Aug. 27, 1981, entitled "Sintering of Silicon Nitride With Be Additive" filed of even date herewith in the names of Svante Prochazka and Charles David Greskovich and assigned to the assignee hereof, and which by reference is made part of the disclosure of the present invention, there is disclosed sintering a compact composed of a mixture of silicon nitride with less than about 0.5 weight % cation impurities and containing beryllium additive, and having an oxygen content of at least about 1.4 weight % from 1900° C. to 2200° C. in nitrogen at superatmospheric pressure producing a compact of at least about 80% density.

What is claimed is:

1. A method of producing a high density pre-shaped sintered polycrystalline silicon nitride body which consists essentially of providing at least a significantly homogeneous dispersion having an average particle size which is submicron of silicon nitride, oxygen and a beryllium additive, said beryllium additive being selected from the group consisting of beryllium, beryllium oxide, beryllium carbide, beryllium fluoride, beryllium nitride, beryllium silicon nitride and mixtures thereof, said beryllium additive being used in an amount wherein the beryllium component is equivalent to from about 0.1% by weight to about 2% by weight of elemental beryllium based on the amount of silicon nitride, shaping said dispersion into a compact, said compact containing oxygen in an amount ranging from about 1.4% weight to about 7% by weight of said silicon nitride, said compact containing increasing amounts of said oxygen with increasing amounts of said beryllium component, said compact containing about 7% by weight oxygen for an equivalent amount of said elemental beryllium of about 2% by weight, and initially first sintering said compact at a temperature ranging from about 1900° C. to about 2100° C. in a sintering atmosphere of nitrogen at supra atmospheric pressure until at least the pores in the entire outside surface of the compact are closed making such sintered surface impermeable to nitrogen gas, said nitrogen pressure during said first sintering ranging from a minimum of about 10 atmospheres at a sintering temperature of about 1900° C. to a pressure of about 37 atmospheres at a sintering temperature of about 2100° C., and then secondly sintering said compact at a temperature ranging from about 1800° C. to about 2100° C. under a pressure of nitrogen ranging from about two times to about four times the value of said first sintering pressure thereby yielding a sintered body with a density ranging from about 95% to about 100%, said nitrogen being at super-atmospheric pressure which at said sintering temperatures prevents significant thermal decomposition of said silicon nitride the maximum pressure of said nitrogen in said second intering being lower than 100 atmospheres.

2. A method according to claim 1 wherein said sintering temperature is about 2000° C. and said minimum pressure of nitrogen during said initial first sintering is about 20 atmospheres.

3. A method according to claim 1 wherein said beryllium additive is beryllium silicon nitride.

4. A method according to claim 1 wherein said beryllium additive is used in an amount wherein the beryllium component is equivalent to from about 0.25% by weight to about 1% by weight of elemental beryllium based on the amount of silicon nitride.

5. The method according to claim 1 wherein the maximum pressure of nitrogen in said second sintering is lower than 100 atmospheres and the maximum sintering temperature is about 2,100° C.

* * * * *